United States Patent
Seo et al.

(10) Patent No.: US 9,073,207 B2
(45) Date of Patent: Jul. 7, 2015

(54) METHOD FOR IMPROVING SENSITIVITY OF ROBOT

(71) Applicant: Hyundai Motor Company, Seoul (KR)

(72) Inventors: Jung Ho Seo, Gyeonggi-do (KR); Woo Sung Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 357 days.

(21) Appl. No.: 13/846,912

(22) Filed: Mar. 18, 2013

(65) Prior Publication Data

US 2014/0172172 A1    Jun. 19, 2014

(30) Foreign Application Priority Data

Dec. 17, 2012  (KR) .......................... 10-2012-0147922

(51) Int. Cl.
*B25J 17/00*    (2006.01)
*B25J 9/16*    (2006.01)

(52) U.S. Cl.
CPC ..................................... *B25J 9/1607* (2013.01)

(58) Field of Classification Search
CPC ..................... B25J 9/1633; G05B 2219/40305
USPC ................... 700/263; 414/2, 5; 600/587, 595;
601/33, 34; 602/16, 20, 23;
73/379.01–379.03, 865.4; 318/568.12,
318/568.15, 568.16, 568.18, 568.21, 568.22
See application file for complete search history.

(56) References Cited

U.S. PATENT DOCUMENTS

| 8,532,824 B2* | 9/2013 | Orita .............................. 700/260 |
| 2007/0073442 A1* | 3/2007 | Aghili ........................... 700/245 |
| 2014/0221894 A1* | 8/2014 | Nagasaka ....................... 602/23 |

FOREIGN PATENT DOCUMENTS

| JP | H06-332535 | 12/1994 |
| JP | H07-223190 | 8/1995 |
| JP | H10-100085 | 4/1998 |
| JP | 2000-218577 A | 8/2000 |
| JP | 3324298 B2 | 9/2002 |
| JP | 2010-218577 A | 9/2010 |

OTHER PUBLICATIONS

Korean Office Action issued in Korean Patent Application No. 10-2012-0147922, dated Dec. 20, 2013.

* cited by examiner

*Primary Examiner* — Dalena Tran
(74) *Attorney, Agent, or Firm* — McDermott Will & Emery LLP

(57) ABSTRACT

A method of improving sensitivity of a robot which includes: a calculation step, an induction step and a conversion step. The calculation step calculates angular velocities of joints of a robot. The induction step determines induced accelerations at the end of the robot by converting the angular velocities of the joints into a velocity at the end of the robot, using a Jacobian matrix, and by differentiating the velocity. The conversion step determines forces at a middle portion of the robot by multiplying the induced accelerations at the middle portion of the robot by a weight of the robot, multiplies the forces by an enhancement ratio, and then converts results of the multiplication into necessary torque at the joints, using a Jacobian matrix.

9 Claims, 5 Drawing Sheets

METHOD FOR IMPROVING SENSITIVITY OF ROBOT

CROSS-REFERENCE TO RELATED APPLICATION

This application is based on and claims benefit of priority to Korean Patent Application No. 10-2012-0147922, filed on Dec. 17, 2012 in the Korean Intellectual Property Office, the entire contents of which are hereby incorporated by reference.

TECHNICAL FIELD

The present inventive concept relates to a method of improving sensitivity of a robot that can improve driving sensitivity of a robot by measuring angles of joints of the robot even without using a specific sensor, and by amplifying and reflecting the angles of driving torque.

BACKGROUND

When lifting a heavy weight in accordance with an intention of a wearer, a wearable muscle assistive robot can lift the heavy weight because a force is transmitted from the wearer to the robot and the transmitted force is amplified through the robot. The present inventive concept relates to a method capable of improving sensitivity of a wearable robot for good transmission of intention from a wearer to the wearable robot, that is, for maximum transmission of force from the wearer to the robot.

Wearable muscle assistive robots of the related art have found out the intention of a wearer by means of EMG (Electromyogram) sensors attached on the wearer's body or torque sensors mounted on driving joints of the robots. A method of using EMG sensors is used to drive an actuator by determining, from contraction and relaxation of muscle, signals for the intention of motion of a wearer and then sending the signals to a robot controller. This method has a problem in that when the wearer moves, the EMG sensors are not accurately in close contact with the body so that the signals for the intention of motion of the wearer are distorted in many cases. On the other hand, a method of using torque sensors measures all of torque exerted in the driving joints of a robot and reflects the intention of a wearer by discriminating the torque for driving the joints of the robot from the torque transmitted to the robot from the wearer. However, using torque sensors reduces the durability of a robot and there is a burden that expensive torque sensors are required.

In the related art, JP2000-218577 A, titled "Robot control system', a robot control system is provided that includes a driving unit position servo means for controlling the positions of driving units of a robot to follow given servo instruction values, provided with a driving unit position feedback loop and a driving unit velocity feedback loop. The robot control system includes: a position error calculation means that calculates differences between position instruction values of the driving units of the robot and the current position of the driving units; a correction amount calculation means that calculates multiplying of the output of the position error calculation means and a position gain correction coefficient set as predetermined value; an addition unit that adds the current positions of the driving units to the output of the correction amount calculation means; a velocity gain correction unit that multiplies the velocities of the driving units of the robot by a predetermined velocity gain correction coefficient; and a correction instruction value calculation unit that calculates a correction instruction value by adding up the output of the velocity gain correction means and the output of the addition means. The output of the correction instruction calculation means is inputted to the driving unit position servo means as servo instruction values for joints.

However, even according to such a technology, it is necessary to know a displacement at the end by calculating a driving value of the robot in advance. Therefore, there is a problem in that the technology did not propose a method of improving sensitivity by finding out the intention of a wearer, when the wearer freely moves, without finding out the displacement and using separate sensors in a wearable robot.

The description provided above as related art of the present inventive concept is just for helping understanding the background of the present inventive concept and should not be construed as being included in the related art known by those skilled in the art.

PRIOR ART DOCUMENT

Patent Document (Patent Document 1) JP2000-218577 A

SUMMARY

The present inventive concept has been made in an effort to solve the above-noted problems and an object of the present inventive concept is to provide a method of improving sensitivity of a robot that can improve driving sensitivity of a robot by measuring angles of joints of the robot even without using a specific sensor, and by amplifying and reflecting the angles of driving torque.

An aspect of the present inventive concept relates to a method of improving sensitivity of a robot. The method includes a calculation step that calculates angular velocities of joints of a robot; an induction step that finds acceleration at the end by converting the angular velocities of the joints into the velocity at the end of the robot, using a Jacobian matrix, and by differentiating the velocity. A conversion step finds forces at the middle portion by multiplying the induced accelerations at the middle portion by the weight, multiplies the forces by the enhancement ratio, and then converts the results into necessary torque at the joints, using a Jacobian matrix.

The calculation step may calculate angular velocities of the joints due to operation by a wearer, using encoders at the joints of the robot.

The conversion step may normalize the axial components of the induced accelerations to values between 0 and 1 and then find the forces at the end through multiplying of the normalized accelerations by the weight.

The induction step may find accelerations at the end by filtering the converted velocities with a low pass filter (LPF) and differentiating the filtered velocities.

The conversion step may find forces at the end by filtering the induced accelerations with an LPF and multiplying the filtered accelerations by the weight.

The conversion step may find the forces at the end with an LPF, multiply the filtered force with an enhancement ratio, and then convert the results into necessary torque at the joints, using a Jacobian matrix.

Another aspect of the present inventive concept encompasses a method of improving sensitivity of a robot. The method includes: a calculation step that calculates angular velocities of joints of a robot; a first induction step that finds acceleration at the end by converting the angular velocities of the joints into the velocity at the end of the robot, using a Jacobian matrix, and by differentiating the velocity. A second induction step finds accelerations at the middle portion of the robot by converting the angular velocities of the joints connected to the middle portion of the robot into velocities at the middle portion of the robot, using a Jacobian matrix, and then differentiating the velocities. A first conversion step finds forces at the end by multiplying the induced accelerations at the end by a weight, multiplies the forces by an enhancement ratio, and then converts the results into necessary torque at the joints, using a Jacobian matrix. A second conversion step finds forces at the middle portion by multiplying the induced accelerations at the middle portion by the weight, multiplies the forces by the enhancement ratio, and then converts the results into necessary torque at the joints, using a Jacobian matrix.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The foregoing and other features of the inventive concept will be apparent from more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept. The accompanying drawings are given hereinbelow by way of illustration only, and thus are not limitative of the present inventive concept, and wherein.

Figure 1:
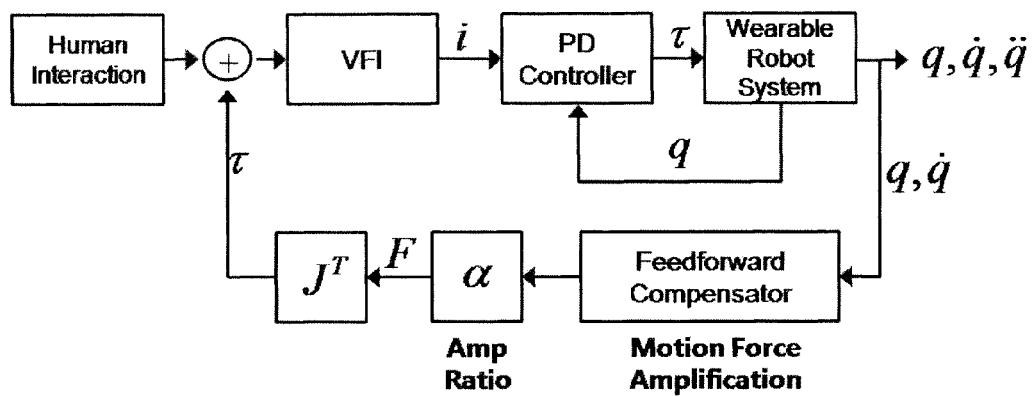
FIG. 1 is a block diagram illustrating a method of improving sensitivity of a robot according to an exemplary embodiment of the present inventive concept.

It should be understood that the accompanying drawings are not necessarily to scale, presenting a representation of various preferred features illustrative of the basic principles of the present inventive concept. The specific design features of the present inventive concept as disclosed herein, including, for example, specific dimensions, orientations, locations, and shapes will be determined in part by a particular intended application and use environment.

In the figures, reference numbers refer to the same or equivalent parts of the present inventive concept throughout the several figures of the drawing.

DETAILED DESCRIPTION

Examples of the present inventive concept will be described below in more detail with reference to the accompanying drawings. The examples of the present inventive concept may, however, be embodied in different forms and should not be construed as limited to the examples set forth herein. Like reference numerals may refer to like elements throughout the specification.

A method of improving sensitivity of a robot according to an exemplary embodiment of the present inventive concept is described hereafter with reference to the accompanying drawings.

Figure 2:
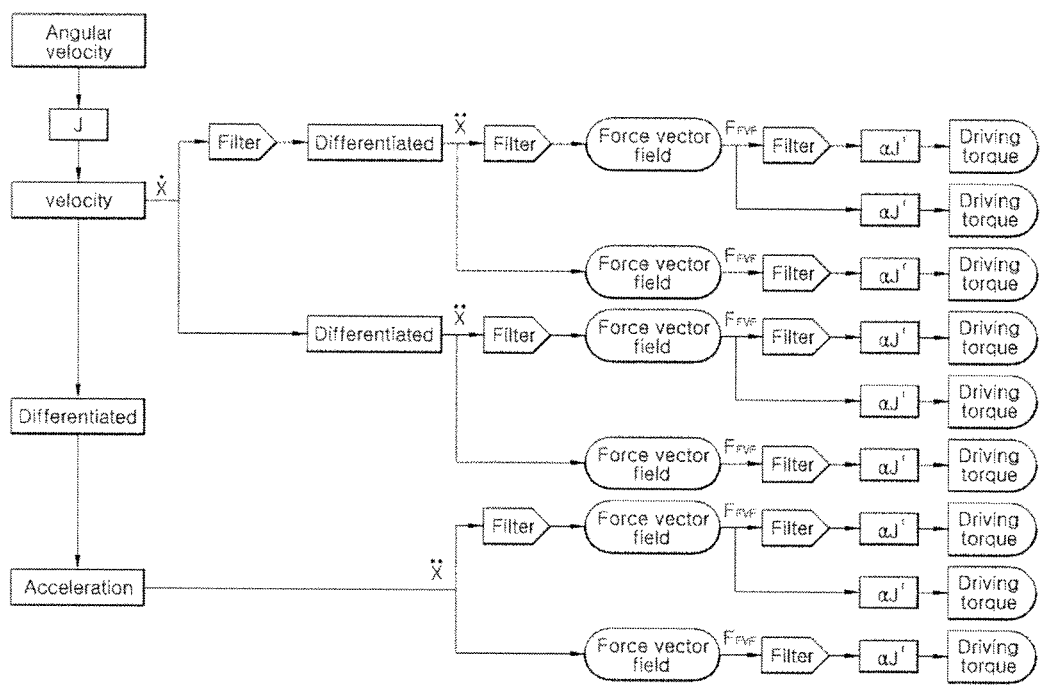
FIG. 2 is a block diagram illustrating addition of filters in a method of improving sensitivity of a robot according to an exemplary embodiment of the present inventive concept.
Figure 3:
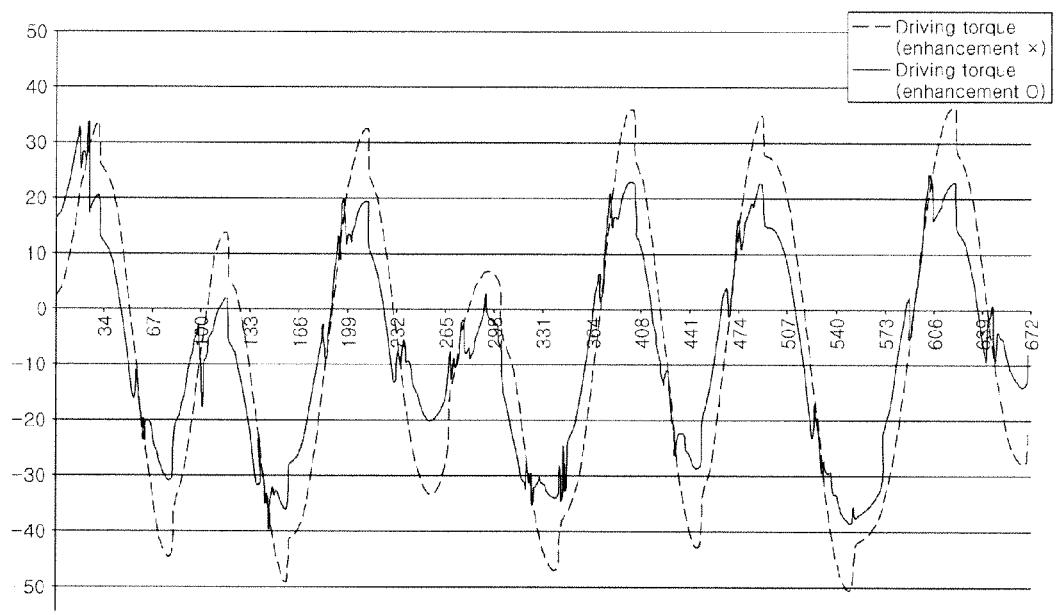
FIG. 3 is a graph illustrating effects of a method of improving sensitivity of a robot according to an exemplary embodiment of the present inventive concept.
Figure 4:
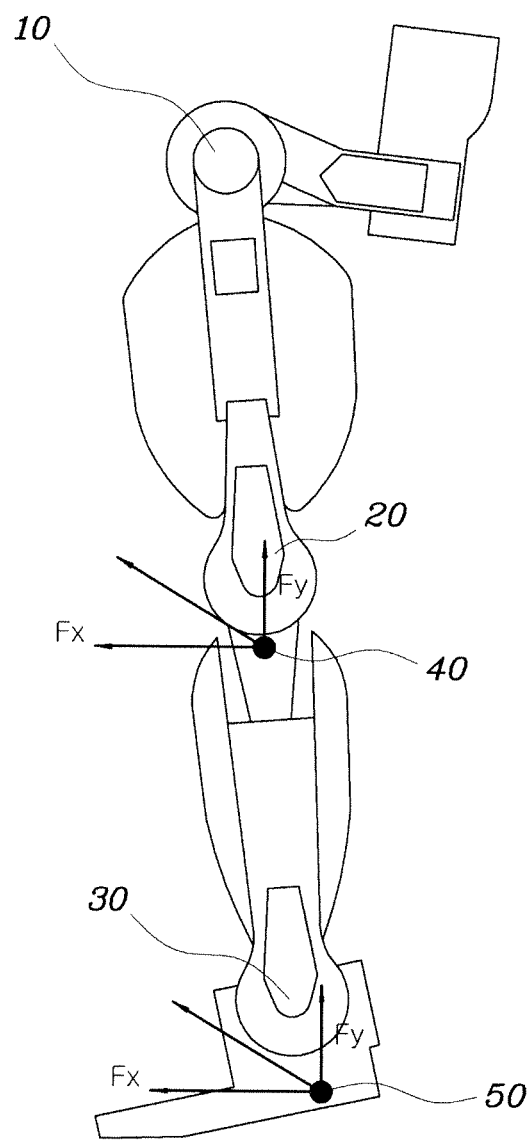
FIG. 4 is a schematic view of a robot for illustrating a method of improving sensitivity of a robot according to an exemplary embodiment of the present inventive concept.
Figure 5:
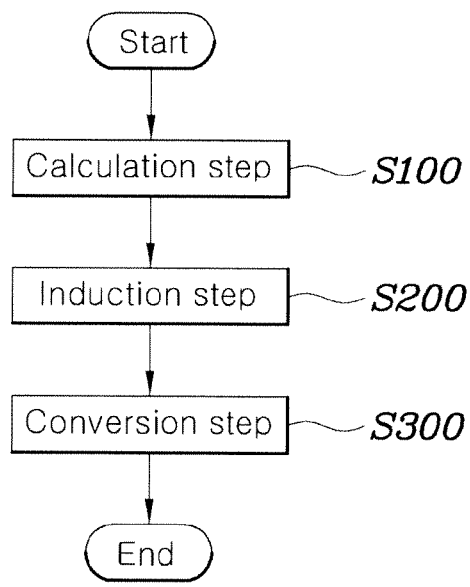
FIGS. 5 and 6 are flowcharts illustrating the method of improving sensitivity of a robot according to an exemplary embodiment of the present inventive concept.
Figure 6:
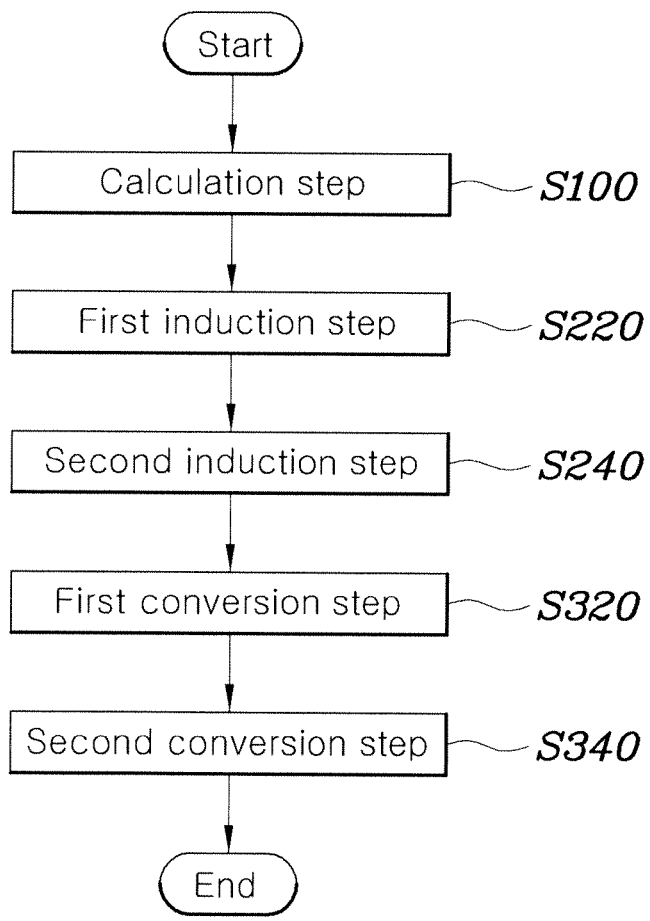

FIG. 1 is a block diagram illustrating a method of improving sensitivity of a robot according to an exemplary embodiment of the present inventive concept. FIG. 2 is a block diagram illustrating addition of filters in a method of improving sensitivity of a robot according to an exemplary embodiment of the present inventive concept. FIG. 3 is a graph illustrating effects of a method of improving sensitivity of a robot according to an exemplary embodiment of the present inventive concept. FIG. 4 is a schematic view of a robot for illustrating a method of improving sensitivity of a robot according to an exemplary embodiment of the present inventive concept. FIGS. 5 and 6 are flowcharts illustrating a method of improving sensitivity of a robot according to an exemplary embodiment of the present inventive concept.

Referring to FIG. 5, a method of improving sensitivity of a robot according to an exemplary embodiment of the present inventive concept may include a calculation step S100 that calculates angular velocities of joints of a robot. An induction step S200 finds acceleration at an end of the robot by converting the angular velocities of the joints into a velocity at the end of the robot, using a Jacobian matrix, and by differentiating the velocity. A conversion step S300 finds forces at a middle portion of the robot by multiplying the induced accelerations at the middle portion by a weight of the robot, multiplies the forces by an enhancement ratio, and then converts results of the multiplication into necessary torque at the joints, using a Jacobian matrix.

That is, the angular velocities by operation of a wearer may be calculated first by means of encoders of the joints. The encoders can calculate angular velocities by measuring an angle and then differentiating the angle.

Further, when the angular velocities at the joints are obtained, the angular velocities may be converted into the velocity at the end of the robot in rectangular coordinates by means of a Jacobian matrix. Further, an acceleration may be obtained by differentiating the velocity at the end of the robot. A force may be calculated by multiplying the acceleration by the weight of the robot. The force may be converted into induced torque at the joints through a Jacobian matrix, and then the induced torque may be input as instructions of joint motors.

In detail, referring to FIG. 5, the conversion step S300 may use a method of reducing noise by normalizing axial components of induced accelerations to values between 0 and 1 and then finding the force at the end through multiplying of the normalized accelerations by the weight of the robot.

Further, the induction step S200 can find the acceleration at the end by filtering the converted velocity with a low pass filter (LPF) and differentiating the result, e.g., the filtered velocity. Alternatively, the conversion step S300 can find the force at the end by filtering the induced acceleration with an LPF and multiplying the result, e.g., the filtered acceleration, by the weight. Alternatively, the conversion step S300 can filter the force at the end with and LPF, multiply the result, e.g., the filtered force, by an enhancement ratio, and then convert the result multiplied by the enhancement ratio into necessary torque at the joints through a Jacobian matrix.

FIG. 1 is a block diagram illustrating a method of improving sensitivity of a robot according to an exemplary embodiment of the present inventive concept, and showing a general configuration.

In detail, a main method of controlling a robot which can be used in an exemplary embodiment of the present inventive concept can be expressed as follows.

$$\tau_{VFI} = -C\dot{q} - k_0\Delta q - J^T(k\Delta x + c\Delta \dot{x}) + g(q) + J^T(\alpha F_{FVF}) \quad \text{[Equation 1]}$$

As can be seen from the equation, joints of a robot may be provided with a virtual spring-damper model. Accordingly, motors of the joints may apply a driving force using a current, but in controlling the motors, driving of the motors may be controlled by means of the spring-damper model.

Further, a virtual spring-damper model may also be disposed at the end of the robot such that that a spring-damper control is performed through the values of the velocity and acceleration relating to a displacement x at the end of the robot. The reacting force at the end may be converted into torque at the joints through the transpose of a Jacobian matrix and then added. Further, the joints of the robot may follow a motion of the end by gravitational compensation at a last step and keep stopped against gravity such as to be in the state of weightlessness.

It may be necessary to find out the intention to move of a wearer and provide the intention as driving input of the joint motors in the wearable robot as an exemplary embodiment of the present inventive concept. To this end, the present inventive concept may improve sensitivity of movement according to intention by finding out intention of a user only with the encoders of the driving motors at the joints, without using a torque-force sensor, and by amplifying the intention.

Further, to this end, $J^T(\alpha F_{FVF})$ may be added to the end of the equation (see Equation 1).

That is, the last term may be for applying torque again to the joints by amplifying a virtual force at the end of the robot and putting the amplified force to the transpose of the Jacobian.

In detail, Equation 2 as presented below describes the process of expressing the angular velocities measured at the joints into linear velocities at the end of the robot by using a Jacobian matrix.

$$\frac{dX}{dt} = J_{11}\dot{q}_1 + J_{12}\dot{q}_2 + J_{13}\dot{q}_3 \quad \text{[Equation 2]}$$

$$\frac{dY}{dt} = J_{21}\dot{q}_1 + J_{22}\dot{q}_2 + J_{23}\dot{q}_3$$

$$\ddot{X} = \frac{d\left(\frac{dX}{dt}\right)}{dt}, \ \ddot{Y} = \frac{d\left(\frac{dY}{dt}\right)}{dt}$$

As can be seen from the equation, angles q1, q2, and q3 at the joints may be converted into angular velocities by differentiation and the values of the angular velocities may be converted into the linear velocities dX/dt, and dY/dt at the end of the robot through the Jacobian Matrix. Further, the linear velocities may be converted into accelerations by differentiation.

The converted accelerations may be expressed as forces in the directions of x axis and y axis by being multiplied by the weight of the robot. Further, the forces may be normalized.

<Calculation of force vector field>

$$F_X = \frac{\text{weight} \times (X \text{ axial acceleration at the end})}{\sqrt{\begin{array}{l}(\text{weight} \times X \text{ axial acceleration at the end})^2 + \\ (\text{weight} \times Y \text{ axial acceleration at the end})^2\end{array}}} \quad \text{[Equation 3]}$$

$$F_Y = \frac{\text{weight} \times (Y \text{ axial acceleration at the end})}{\sqrt{\begin{array}{l}(\text{weight} \times X \text{ axial acceleration at the end})^2 + \\ (\text{weight} \times Y \text{ axial acceleration at the end})^2\end{array}}}$$

$$F_X = \frac{m\ddot{X}}{\sqrt{(m\ddot{X})^2 + (m\ddot{Y})^2}}, \ F_Y = \frac{m\ddot{Y}}{\sqrt{(m\ddot{X})^2 + (m\ddot{Y})^2}}$$

As can be seen from Equation 3, the force components may be added up into a diagonal resultant force and the force components may be normalized into values between 0 and 1 by being divided by the diagonal resultant force. With this process, it is possible to reduce the components of noise and input instructions to the motors at the joints under predetermined rules. On the other hand, for example, when the control is in relation to an upper arm or a leg of a robot, the end may be the end of the upper arm or the end of the leg and the weight may be the weight of the upper arm or the weight of the leg.

Further, the components of the forces at the end of the robot which have been normalized in such a way may be converted again into torque at the joints through the transpose of the Jacobian.

$$\tau_1 = -C_1\dot{q}_1 - k_{0_1}\Delta q_1 - \quad \text{[Equation 4]}$$
$$J^T(k_1\Delta x + c_1\Delta\dot{x}) + g_1(q) + (J_{11}\alpha F_X + J_{21}\alpha F_Y)$$

$$\tau_2 = -C_2\dot{q}_2 - k_{0_2}\Delta q_2 - J^T(k_2\Delta x + c_2\Delta\dot{x}) +$$
$$g_2(q) + (J_{12}\alpha F_X + J_{22}\alpha F_Y)$$

$$\tau_3 = -C_3\dot{q}_3 - k_{0_3}\Delta q_3 - J^T(k_3\Delta x + c_3\Delta\dot{x}) +$$
$$g_3(q) + (J_{13}\alpha F_X + J_{23}\alpha F_Y)$$

$$\tau_1 = -C_1\dot{q}_1 - k_{0_1}\Delta q_1 - J^T(k_1\Delta x + c_1\Delta\dot{x}) + g_1(q) +$$
$$\left(J_{11}\frac{\alpha m\ddot{X}}{\sqrt{(m\ddot{X})^2 + (m\ddot{Y})^2}} + J_{21}\frac{\alpha m\ddot{Y}}{\sqrt{(m\ddot{X})^2 + (m\ddot{Y})^2}}\right)$$

$$\tau_2 = -C_2\dot{q}_2 - k_{0_2}\Delta q_2 - J^T(k_2\Delta x + c_2\Delta\dot{x}) + g_2(q) +$$
$$\left(J_{12}\frac{\alpha m\ddot{X}}{\sqrt{(m\ddot{X})^2 + (m\ddot{Y})^2}} + J_{22}\frac{\alpha m\ddot{Y}}{\sqrt{(m\ddot{X})^2 + (m\ddot{Y})^2}}\right)$$

$$\tau_3 = -C_3\dot{q}_3 - k_{0_3}\Delta q_3 - J^T(k_3\Delta x + c_3\Delta\dot{x}) + g_3(q) +$$
$$\left(J_{13}\frac{\alpha m\ddot{X}}{\sqrt{(m\ddot{X})^2 + (m\ddot{Y})^2}} + J_{23}\frac{\alpha m\ddot{Y}}{\sqrt{(m\ddot{X})^2 + (m\ddot{Y})^2}}\right)$$

As in Equation 4, the force components Fx and Fy at the end may be expressed as torque at the joints by the transpose of the Jacobian.

Further, it is possible to adjust the sensitivity by multiplying the torque by an augmentation ratio α.

Therefore, the motors at the joints of the robot may be controlled by all of unique control of a spring-damper model, control of the spring-damper model and gravitational compensation at the end, and the torque due to the intention of the wearer.

Meanwhile, FIG. 2 is a block diagram about the addition of filters in the method of improving sensitivity of a robot according to an exemplary embodiment of the present inventive concept, in which it is also possible to remove noise by adding a low pass filter (LPF) between processes in the entire procedure of converting the angular velocities of joints into velocities at the end, calculating the velocities at the end into accelerations, finding force components from the accelerations, and converting the force components into torque at the joints.

Further, FIG. 3 is a graph illustrating effects of a method of improving sensitivity of a robot according to an exemplary embodiment of the present inventive concept. The graph shows that the sensitivity of a robot was improved, as torque more rapidly increases from bottom points or decreases from top points in a method of the present inventive concept in comparison to an otherwise case.

Further, FIG. 4 is a schematic view of a robot for illustrating a method of improving sensitivity of a robot according to an exemplary embodiment of the present inventive concept, in which there may be three joints 10, 20, and 30, and a motor and an encoder may be mounted on each of the joints under the assumption that the robot is a leg.

Further, as a wearer walks, the encoders at the joints may measure angular velocities, induce force components at the end from the angular velocities, convert the force components into torque at the joints, and apply the result such that intention of the wearer can be reflected to drive the motors at the joints.

Further, as the knee follows the leg's movement more faster, the sensitivity is more improved when the leg moves. Therefore, referring to FIG. 6, the method may perform: a calculation step S100 that calculates angular velocities of joints of a robot; a first induction step S220 that determines, an acceleration at the end by converting the angular velocities of the joints into the velocity at the end of the robot, using a Jacobian matrix, and by differentiating the velocity; a second induction step S230 that determines, induced accelerations at the middle portion of the robot by converting the angular velocities of the joints connected to the middle portion of the robot into velocities at the middle portion of the robot, using a Jacobian matrix, and then differentiating the velocities; a first conversion step S320 that determines, forces at the end by multiplying the induced accelerations at the end of the robot by a weight of the robot, multiplies the forces by an enhancement ratio, and then converts the results into necessary torque at the joints, using a Jacobian matrix; and a second conversion step S340 that determines, forces at the middle portion by multiplying the induced accelerations at the middle portion by the weight, multiplies the forces by the enhancement ratio, and then converts the results into necessary torque at the joints, using a Jacobian matrix.

That is, the same processes may be performed on the end of the robot and on the middle portion of the robot. However, for the middle portion, only the angular velocities of the joint above the middle portion may be converted and the induced force components may also be applied as torque at the joints of the middle portion.

According to exemplary embodiments of the present inventive concept, referring to FIG. 4, force components at an end 50 may be found from the angular velocities of the first, second, and third joints 10, 20, and 30 and the force components may be all reflected on the first, second, and third joints 10, 20, and 30.

Further, force components at the middle portion 40 may be found from the angular velocities of the first and second joints 10 and 20 and the force components may be reflected as torque on the first and second joints 10 and 20.

According to a method of improving sensitivity of a robot with the structure described above, it is possible to improve sensitivity of a robot by measuring angles at joints of the robot and amplifying and reflecting the angles on driving torque, even without using separate sensors.

Further, the present inventive concept can propose a method of controlling a wearable robot to operate, following the intention of a wearer in accordance with circumstances and can improve sensitivity, using only values from encoders attached to the driving joints.

Further, it is possible to control a wearable robot by reflecting intention of a wearer without additionally mounting sensors, different from the control methods for wearable robots in the related art.

The present inventive concept has been described in detail with reference to preferred embodiments thereof. However, it will be appreciated by those skilled in the art that changes may be made in these embodiments without departing from the principles and spirit of the present inventive concept, the scope of which is defined in the appended claims and their equivalents.

What is claimed is:

1. A method of improving sensitivity of a robot, the method comprising:
a calculation step that calculates angular velocities of joints of the robot using encoders at the joints of the robot;
an induction step that determines an acceleration at an end of the robot by converting the angular velocities of the joints into a velocity at the end of the robot, using a Jacobian matrix, and by differentiating the velocity; and
a conversion step that determines forces at a middle portion of the robot by multiplying induced accelerations at the middle portion by a weight of the robot, multiplies the forces by an enhancement ratio, and then converts results of the multiplication into necessary torque at the joints, using a Jacobian matrix.

2. The method of claim 1, wherein the robot is a wearable robot, and the calculation step includes calculating the angular velocities of the joints due to operation by a wearer.

3. The method of claim 1, wherein the conversion step includes normalizing axial components of the induced accelerations to values between 0 and 1 and then determining the forces at the end of the robot through multiplying of the normalized accelerations by the weight of the robot.

4. The method of claim 1, wherein the induction step includes determining accelerations at the end of the robot by filtering the converted velocities with a low pass filter (LPF) and differentiating the filtered velocities.

5. The method of claim 1, wherein the conversion step includes determining forces at the end of the robot by filtering the induced accelerations with a low pass filter (LPF) and multiplying the filtered accelerations by the weight of the robot.

6. The method of claim 1, wherein the conversion step includes filtering forces at the end with a low pass filter (LPF), multiplying the filtered force with an enhancement ratio, and then converting results of the multiplication into necessary torque at the joints, using the Jacobian matrix.

7. A method of improving sensitivity of a robot, comprising:
a calculation step that calculates angular velocities of joints of the robot using encoders at the joints of the robot;

a first induction step that determines an acceleration at the end of the robot by converting the angular velocities of the joints into a velocity at the end of the robot, using a Jacobian matrix, and by differentiating the velocity;

a second induction step that determines induced accelerations at a middle portion of the robot by converting the angular velocities of the joints connected to the middle portion of the robot into velocities at the middle portion of the robot, using a Jacobian matrix, and then differentiating the converted velocities;

a first conversion step that determines forces at the end of the robot by multiplying the induced accelerations at the end of the robot by a weight of the robot, multiplies the forces by an enhancement ratio, and then converts results of the multiplication into necessary torque at the joints, using a Jacobian matrix; and a second conversion step that determines forces at the middle portion of the robot by multiplying the induced accelerations at the middle portion of the robot by the weight of the robot, multiplies the forces by the enhancement ratio, and then converts results of the multiplication into necessary torque at the joints, using a Jacobian matrix.

8. The method of claim 1, further comprising:
applying the result of the conversion step to drive a motor at at least one of the joints.

9. The method of claim 7, further comprising:
applying the results of the first and second conversion steps to drive motors at the joints.

* * * * *